2,857,370

PROCESS OF PREPARING ESTER AND AMIDE TYPE ANIONIC SURFACE ACTIVE AGENTS

Robert L. Sundberg, Alpha, N. J., assignor to General Aniline & Film Corporation, New York, N. Y., a corporation of Delaware No Drawing. Application November 22, 1954
Serial No. 470,500

6 Claims. (Cl. 260—97.5)

This invention relates to an improved process of preparing alkali metal, alkaline earth metal, and tertiary aromatic amine salts of esters and amide type compounds from carboxylic acids and amino- or hydroxy-alkane sulfonic acids.

The reaction of fatty acids, fatty acid chlorides and fatty acid esters with 2-amino- or 2-hydroxy-alkane sulfonic acids and the alkali metal salts thereof to yield anionic surface active materials useful as wetting, cleansing, softening and dispersing agents is well known. In U. S. P. 1,932,180 several processes are described for the preparation of such surface active materials. The processes fall into three categories wherein (1) a free fatty acid dissolved in an aliphatic amine is mixed with an amino-alkane sulfonic acid (taurine) and then heated to boiling, (2) an alkyl ester of a fatty acid is heated with the sodium salt of an amino-alkane sulfonic acid and (3) a carboxylic acid chloride is treated in aqueous medium with a 2-amino-alkane sulfonic acid in the presence of caustic soda. The latter process is the one principally used in the preparation of the surface active agents sold under the name of "Igepons." The preparation of the carboxylic acid chloride employed as an intermediate is not only hazardous but time-consuming and costly, since it employs the expensive phosphorus trichloride. In addition, when the acid chloride is treated with a taurine or a taurine salt, an anionic agent is obtained containing a considerable quantity of salt, i. e. sodium chloride, which is highly undesirable when the anionic surface active agent is employed in built soap-bar formulations. The presence of sodium chloride is the reason why some "Igepons" currently sold possess great hygroscopicity. The removal of the free salt from the "Igepon" is very expensive.

The reaction of a fatty acid with a slight excess of a taurine in accordance with the teachings of the aforementioned patent leads to poor yields. The use of equivalent amounts of reactants in this reaction leads to considerable taurine decomposition. In order to overcome the shortcomings, it has been proposed in the art to obtain a salt-free product by condensing presumably one mole of a fatty acid with one mole of a taurine salt at a temperature of about 220° C., but no advantage was found over the acid chloride method. The time of dehydration can be decreased if the temperature, depending upon the fatty acid employed, is quickly increased to 250–260° C. or higher near the end of the reaction while employing a vacuum around 15 mm. of mercury. In the latter case, however, a small amount of the fatty acid distills over with the water formed during the dehydration reaction. To promote the dehydration reaction, about 10 percent anhydrous sodium sulfate may be added to the reaction mixture. After the distillation of the fatty acid and the water formed the final product after cooling is a solid soap mixture capable of being ground.

I have found that the disadvantages inherent in the foregoing processes can be readily overcome by employing a procedure which eliminates the preparation and use of the fatty acid chloride, utilizes a much shorter time of reaction, and yields a salt-free product. In essence, the process consists of heating a carboxylic acid with an alkali metal, alkaline earth metal or a tertiary amine salt of a taurine or of a 2-hydroxy-alkane sulfonic acid in the presence of a boron-containing compound as a catalyst at reduced pressure, or in an inert atmosphere. An essential, in fact, a critical feature of the process is that the carboxylic acid must be used in excess of the theoretical molar quantity, e. g., 1.2 to about 10.0 moles preferably 1.5 to 2.0 moles of the carboxylic acid, with 1 mole of a salt of a taurine or a salt of a 2-hydroxy-alkane sulfonic acid. The use of a boron-containing compound as a catalyst is necessary to obtain a fast reaction. All of the salts are converted to the final product free from any inorganic salt. A salt-free product may also be prepared at a mole ratio of 2 carboxylic to 1 of the salt of a taurine or the salt of a 2-hydroxy-alkane sulfonic acid. Inasmuch as an excess of monocarboxylic acid is employed, the final product will inherently contain some free carboxylic acid, but no inorganic salt. As the result thereof, the final product is particularly adaptable for built-soap bar type formulations, skin creams, lotions, salves, and in food products as foaming agents, and other uses wherein the presence of a mineral acid salt of an alkali metal, alkaline earth metal or tertiary amine is undesirable, as will be pointed out hereinafter.

The reaction temperature, depending upon the carboxylic acid used and the reaction time desired, may range from 200–320° C. The latter temperature range is employed for a short reaction time, such as, for example, less than 5 minutes, whereas for a longer reaction time such as 2 hours a temperature range of 220–260° C. is employed. The condensation or esterification reaction may be carried out either at reduced pressure or in an inert atmosphere. When employing reduced pressures, 10–200 mm. mercury absolute pressures are preferred. Pressures less than 10 mm. mercury may be used if the fatty acid is not too volatile. The vacuum will therefore depend on the volatility of the carboxylic acid and the reaction temperature. If the reaction is to be carried out at atmospheric pressure an inert gas such as nitrogen is passed through the reaction mixture to assist in the removal of the water formed.

The water may also be removed by use of a water-immiscible solvent such as xylene, toluene, chlorobenzene, dichlorobenzene, chlorinated hydrocarbons, alkylbenzenes, alkylnaphthalenes, etc. The use of immiscible solvents has the disadvantage of higher cost due to the expense of solvent recovery and losses and the reaction rate is affected by the insolubility of most sulfonic acid salts in these solvents.

The molar ratio of reactants consists of, as noted above, a slight molar excess of carboxylic acid, preferably in the range of 20% to 100% molar excess of carboxylic acid to 1 mole of the alkali metal, alkaline earth metal or tertiary amine salt of a taurine or a 2-hydroxy-alkane sulfonic acid.

Also, if a specific acylated tauride salt carboxylic acid soap mixture (high soap content) is desired, additional fatty acid can be used to arrive at the final composition. Thus, 10 or more moles of carboxylic acid can be used in conjunction with 1.0 mole of taurine, followed by treatment with an appropriate alkaline agent to yield salts. Above 100% excess carboxylic acid, the cost of the final product is slightly increased by greater heat requirements and increased carboxylic acid losses. Accordingly, therefore, it is preferable to employ the carboxylic acid in the range between 20% and 50% molar excess. In some cases a 100% excess of carboxylic acid is necessary to reduce the viscosity of the reaction mixture.

The reaction time will depend upon the reaction temperature and the rate of water removal. For best results a short reaction time using high temperature is preferred. However, a long reaction time with low temperatures may be employed to give a good yield of final product. The time in such case may range for a period of not more than 10 hours. When employing high temperatures the reaction may be completed within 15 seconds to 2 hours.

The boron-containing compound employed as catalyst ranges from 0.01 to 10% of the weight of the reactants, preferably in the range of 0.1 to 3%. It is to be noted that the nature or character of the boron containing compound is immaterial, in fact, any compound which can form boric acid or dehydration products of boric acid when employed in the process of the instant invention is equally applicable. Compounds of this type comprise boric acid, borax, fluoboric acid and salts, and boron fluoride addition products with diethyl ether, water, lower alcohols, such as, methanol, ethanol, propanol, and the like; ammonia and various aliphatic and aromatic amines, ethylamine, aniline, carboxylic acids, e. g. acetic acid, propionic acid, benzoic acid, stearic acid, and the like; amides, such as, acetamide, propionamide and the like; phenols, thiophenol, cresols, naphthols, and the like. It is believed that the boron-containing compound acts as a coordinating type molecule as well as a dehydrating catalyst. It has not been determined, however, whether catalysis occurs on the particles of the catalyst, or whether some of the catalyst dissolves in the reaction mixture. Regardless of the phenomenon that may take place, the presence of a boron-containing compound as a catalyst in the process of the present invention is essential in that it greatly accelerates the reaction rate and allows the process to be made continuous. In addition, the catalyst prevents decomposition of the taurine. This is very important since taurine decomposition adds greatly to the expense of the process and produces a bad odor in the product. For practical purposes I prefer to employ boric acid, since it is readily available at a low price.

It is also known that boric acid dehydrates to form the following compounds (anhydrides of boric acid):

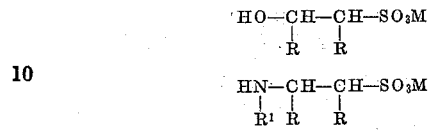

and since no appreciable catalysis in our reaction occurs below 180° C., it is possible that $H_2B_4O_7$ or $B_2O_3$ or a mixture thereof are the true catalysts.

As examples of carboxylic acids which may be employed in the condensation or esterification reaction any carboxylic acid of at least 6 carbon atoms whether saturated, unsaturated, aliphatic, aromatic or cyclic aliphatic may be employed, the nature and character of the acid is immaterial so long as it contains a carboxylic acid group. Acids of this type which may be used include the following: Caproic acid, caprylic acid, pelargonic acid, capric acid, lauric acid, myristic acid, palmitic acid, stearic acid, oleic acid, linoleic acid, tall oil acid, hydrogenated tall oil acids, hydrogenated tallow acids, naphthenic acids, abietic acids. Alkyl benzoic acids such as, dodecylbenzoic acid, nonylbenzoic acid, octylbenzoic acid, alkylnaphthoic acids such as nonylnaphthoic acid, acids from oxo alcohols and aldehydes, acids from oxidized petroleum fractions, etc. Acid mixtures from various natural plant and animal oils such as, olive, tallow, castor, peanut, coconut, soybean, cottonseed, ucahuba, linseed; fish oils such as, cod, herring, menhaden, etc., neatsfoot, sperm, palm, corn, butter, babassu, kapok, hempseed, mustard, rubberseed, rape, safflower, sesame, etc. may also be employed.

The 2-amino-alkane sulfonic acid salts and 2-hydroxyalkane sulfonic acid salts that are condensed with the foregoing carboxylic acids are characterized by the following general formulae:

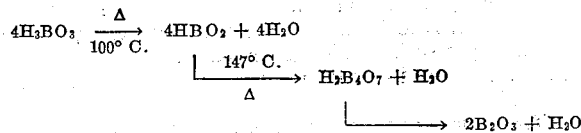

wherein R represents either hydrogen, methyl or ethyl, $R^1$ represents either hydrogen or a hydrocarbon radical having from 1 to 20 carbon atoms, e. g. methyl, ethyl, propyl, butyl, amyl, hexyl, cyclohexyl, phenyl, heptyl, octyl, dodecyl, oleyl, linoleyl, stearyl, abietinyl, etc., and M represents an alkaline earth metal, e. g., calcium, magnesium, barium, alkali metal, e. g., lithium, sodium, potassium, or a tertiary amine, e. g., trioctylamine, N,N-diphenylmethylamine, N,N-dimethyloctadecylamine, etc. Highly hindered secondary amines may also be employed especially those which do not readily form amides with fatty acids.

As examples of 2-amino-alkane sulfonic acids and 2-hydroxy-alkane sulfonic acids that are reacted in the form of their salts with the above carboxylic acids to form anionic surface active agents, the following are illustrative:

2-amino-alkane sulfonic acids:
　Taurine
　Ditaurine
　N-methyl taurine
　N-methyl ditaurine
　N-ethyl taurine
　N-propyl taurine
　N-isopropyl taurine
　N-butyl taurine
　N-isobutyl taurine
　N-tert.-butyl taurine
　N-amyl taurine
　N-hexyl taurine
　N-cyclohexyl taurine
　N-phenyl taurine
　N-heptyl taurine
　N-octyl taurine
　N-dodecyl taurine
　N-oleyl taurine
　N-linoleyl taurine
　N-stearyl taurine
　N-abietinyl taurine
　N-dihydroabietinyl taurine
　N-methyl-2-methyl taurine
　N-methyl-2-ethyl taurine
　N-methyl-1,2-dimethyl taurine
2-hydroxy-alkane sulfonic acids:
　Isethionic acid
　2-hydroxy-propane-sulfonic acid
　2-hydroxy-2-butane-sulfonic acid
　2-hydroxy-1-butane-sulfonic-acid The above 2-amino-alkane sulfonic acids and 2-hydroxy-alkane sulfonic acids are employed in the form of their sodium, potassium, calcium, magnesium, etc., or secondary or tertiary amino salts. The salts are readily prepared by neutralization of the acid with an equivalent amount of an alkali metal, alkaline earth metal, hydroxide or carbonate, or secondary or tertiary aliphatic or aromatic amines, such as, for example:

N,N-diphenylmethylamine
Trioctylamine
N,N-dimethyloctodecylamine
N,N-dioctodecylethylamine
N,N-dihexadecylmethylamine The taurine salts and 2-hydroxy-alkaline sulfonic acid salts may be used as aqueous solutions or as dried powders. In the former case, the water is removed during the reaction in the presence of carboxylic acid. The carboxylic acid helps to stabilize taurines. In the absence of carboxylic acid, heating taurines at high temperature causes evolution of an amine or ammonia to form di- or tritaurines:

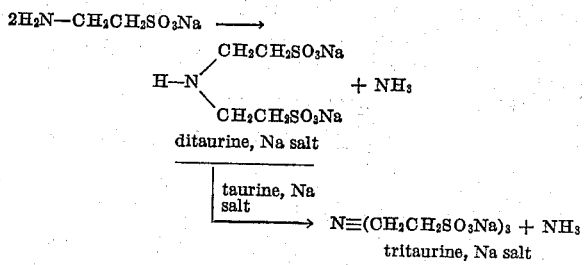

In view of the high yields obtained by the process of this invention, the following reactions are also believed to occur in addition to the main reaction of the carboxylic acid with the taurine:

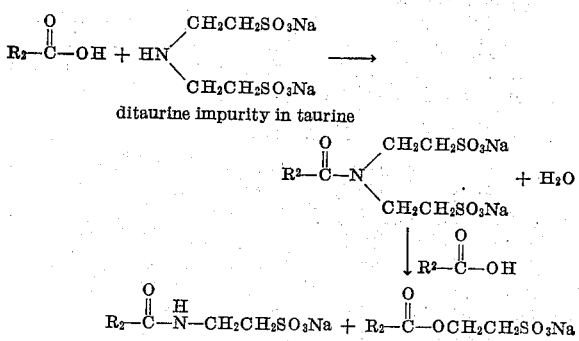

wherein $R^2$ represents an aliphatic or alicyclic radical.

Similarly, tritaurine could react to form one molecule of amide anionic, two molecules of ester anionic and one molecule of water.

The products obtained by this process are valuable anionic surface active agents and have many varied commercial uses. The most conspicuous property of these products is their great activity at surfaces and interfaces which promotes their use in a large field of the technical arts. For instance, they can be used as wetting, frothing, or washing agents in the treating and processing of textiles; for converting liquid or solid substances which per se are insoluble in water (such as hydrocarbons, higher alcohols, oils, fats, waxes, and resins) into creamy emulsions, clear solutions, or fine stable dispersions; for carbonizing; for dyeing; for the pasting of dyestuffs; for fulling, sizing, impregnating and bleaching treatments; as cleansing agents in hard water; in tanning and mordanting processes; for dyeing acetate with insoluble dyestuffs; for the preparation of dyestuffs in finely divided form; for dispersible dye powders; for producing foam for fire extinguishers; as a means for improving the absorptive power of fibrous bodies; and as an aid in softening hides and skins.

In addition, these products are valuable emulsifiers for insecticidal compositions and agricultural sprays such as DDT, 2,4-D, toxaphene, chlordane, dormant or mineral oil sprays, nicotine sulfate, Methoxychlor, etc. and are effective dispersants for pesticidal powders, such as those containing the above toxicants.

These products are also valuable for use as additives to petroleum products, such as fuel oils, lubricating oils, greases, and as additives to the water or brine used for oil recovery from oil-bearing strata by flooding techniques.

Other valuable uses are in metal cleaning compositions; dry cleaning compositions; additives for rubber latices; foam inhibitors for synthetic rubber latex emulsions; froth flotation agents; additives for road building materials; as air entraining agents for concrete or cement; additives to asphalt compositions; plasticizers and modifiers for vinyl plastics, alkyd resins, phenol-formaldehyde resins and other types of polymeric-type plastic materials; for incorporation into adhesives, paint, linoleum; for use in bonding agents used in various insulating and building materials; as refining aids in wood digesters to prepare pulp; as additives to pulp slurries in beating operations to prevent foaming and also to aid the beating operation in paper-making; and as aids in the preparation of viscose dope.

The products are also useful as emulsifiers for emulsion polymerization, as mercerizing assistants, wetting agents, rewetting agents, dispersing agents, detergents, penetrating agents, softening agents, lime soaps dispersants, dishwashing agents, anti-static agents, disinfectants, insecticides, moth-proofing agents, bactericides, fungicides and biocides. They are valuable as anti-fogging agents for use on glass and other surfaces where the accumulation of an aqueous fog is detrimental. They are useful in the rayon industry as additives to the dope or to the spinning bath and as aids in clarifying viscose rayon. They are of value in hydraulic fluids to improve viscosity characteristics.

The products are especially useful in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

They are useful as corrosion inhibitors, as rust inhibitors, in the protection of metals especially ferrous metals, in acid pickling baths, in acid cleaning compositions, and in electro-plating baths. Other valuable uses are as solvents or in solvent compositions, as cleaning agents for paint brushes, as additives for paints, lacquers, and varnishes; as lubricants, as greases and stuffing agents.

The products may be employed in the preparation of skin creams, lotions, salves and other cosmetic preparations such as home hair-wave sets, shaving creams, shampoos, toothpastes, etc. They may also be employed in food products as foaming agents, emulsifying agents, and softening agents.

They may be used as aids in conditioning of soil; as aids in the grinding, milling or cutting of metals either in aqueous solution, emulsions or in oils; as aids in the fixing of dyes to leather and natural or synthetic fibers; as aids in level dyeing of fibers; as aids in stimulating plant growth; as an additive to cement to improve the strength of the resulting concrete or to improve its hardening time or its resistance to freezing and thawing or scaling; and as curing aids and penetrants for use in fertilizer.

The following examples will further illustrate the nature of the improved process which, however, is not to be considered as being limitative thereof. The parts given are all by weight.

The following two examples, utilizing the reactive components but without a catalyst, are given for comparison. Example I may be considered optimum reaction conditions when no catalyst is used. Example II shows the poor yields obtained without catalyst at high temperature.

EXAMPLE I

In a 250 cc. 3-necked flask equipped with a stirrer, stopper and exit to aspirator vacuum, were placed 11.8 parts of dry sodium methyl tauride and 26.4 parts of stearic acid. The flask was then placed in an oil bath which was thermostatically controlled at 220° C. and held at this temperature for 10 hours with stirring and under aspirator vacuum. The product (molten at 220° C.) was cooled and the resultant brittle waxy tan mass chipped out. The weight of the final product amounted to 36.3 parts, and the analysis thereof indicated an activity of 65%. This corresponds to a conversion of 90% of the methyl taurine to N-stearoyl taurine, Na salt.

The analysis of the product is as follows:

N-stearoyl taurine, sodium salt:

| | Percent |
|---|---|
| Anionic surface active agent "Igepon" | 65 |
| Stearic acid | 26.9 |
| Methyl taurine, sodium salt | 1.5 |
| Decomposition product of stearic acid | 3.7 |
| Other (by difference) | 2.9 |

The determination of active anionic surface active agent in the foregoing analysis was made by the methylene blue method described in Nature, 160, 759 (1947) and Trans. Faraday Soc., 44, 226–239 (1948). The determination of stearic acid was made by extraction with petroleum ether and titration of the petroleum ether residue. The methyl taurine sodium salt was determined by titration of the solution which had been extracted with petroleum ether to remove the fatty acid and the other components (by difference) were determined from the weight of the petroleum ether residue subtracting stearic acid.

EXAMPLE II

Into a beaker were placed 36.8 parts (0.2 equivalent to amino) of crude methyl taurine sodium salt and 85.2 parts (0.3 mole) of stearic acid. The beaker contents were heated until melted and stirred well. 6.66 parts of the stirred mixture were placed into an 8" test tube and the contents heated in a Wood's metal bath which was regulated at 300° C. for 10 minutes while keeping the tube contents under 25 mm. of mercury absolute pressure.

The product was analyzed by the methylene blue method as in Example I. The percent conversion to N-stearoyl taurine, sodium salt was 52.3% based upon the amino content at the start. There was obtained 99% of the theoretical excess of fatty acid (determined by extraction with petroleum ether and caustic titration).

This example clearly illustrates that despite higher temperature which may be expected to give a faster reaction, a poorer yield was obtained.

The following examples will show the improved results obtained by the process where a boron-containing compound is employed as the catalyst:

EXAMPLE III

This example is similar to Example I except for the addition of boric acid as a catalyst and much shorter reaction time.

The following materials were well mixed and melted in a beaker by stirring at 140° C.

36.8 parts (0.2 mole) of methyl taurine powder sodium salt (not completely dried), 85.2 parts (0.3 mole) of stearic acid and 3.66 parts of boric acid. 7.44 parts of the melt were added to a test tube and placed under vacuum from a water aspirator, 20–30 mm. mercury absolute pressure. The test tube was placed in an oil bath regulated at 220° C. for 2 hours. There was vigorous evolution of water during the reaction period.

Analysis for anionic surface active component by the methylene blue method showed that the product contained 0.01055 mole anionic surfactant. This corresponds to 89.1% conversion of methyl taurine to surfactant. The product was a light tan that appeared almost white upon being ground to a powder.

EXAMPLE IV

Stearic acid and methyl taurine powder (sodium salt) were mixed in the ratio of 1.5 moles stearic acid to 1 mole methyl taurine powder. To 5.89 parts of the mixture in a glass container was added 0.18 part of boric acid and the resulting mixture heated at 280° C. for 18 minutes under 25 mm. mercury absolute pressure. There was obtained 97.4% conversion of methyl taurine to anionic surfactant by methylene blue analysis. The fatty acid was extracted and titrated. Titration showed 99% of the unreacted fatty acid was recovered. A similar amidification reaction as above but without boric acid catalyst showed extensive decomposition of methyl taurine at 260° C., leading to a dark product obtained in poor yield.

EXAMPLE V

Into a 500 cc. 4-necked flask equipped with stirrer, condenser (downward), and thermometer were placed 66 parts (0.3 mole) of stripped coco-fatty acids, 36.83 parts (0.2 mole) of methyl taurine powder, (87.4% methyl taurine based on titratable amino) and 5.14 parts of boric acid, C. P. (5% of the charge). The flask contents were heated at 222° to 232° C. for 1 hour with stirring at 20 mm. mercury absolute pressure. There was obtained 99.72 parts of a light tan product. Analysis for anionic surfactant, by the methylene blue method showed 1.96 millimoles per gram, or 97.6% conversion of methyl taurine to surfactant. The product foamed well in water and gave good lime soap dispersion (using sodium oleate in hard water).

EXAMPLE VI

Into a 2-liter flask equipped with efficient stirrer, thermometer and air condenser leading to a vacuum take-off, were placed 423 parts (1.5 moles) of C. P. oleic acid, 170.3 parts (1.0 equiv. amino) of crude partially dried taurine powder (which contained some isethionic acid, sodium salt) and 17.8 parts of reagent grade boric acid. The flask contents were heated under partial vacuum to 250° C. and held at 256–258° C. at 35 mm. mercury absolute pressure for two hours. The final product weighing 569.5 parts was a light brown soft, solid when allowed to cool to room temperature. Analysis for anionic surfactant by the methylene blue method showed 1.79 millimoles per gram. This corresponds to slightly more than 100% yield when multiplied by the weight of final product (1.02 moles surfactant from 1.0 equivalent of taurine). The product had good lime soap dispersing power.

EXAMPLE VII

Into a 4-liter resin pot equipped with efficient stirrer, thermometer, and air condenser connected with a vacuum line were placed 607.7 parts (3.3 equiv. of total amino) of spray dried methyl taurine, sodium salt, 1347.9 parts (4.95 equiv.) of tallow fatty acids and 39.1 parts (0.645 mole) of boric acid. The mixture was heated with stirring under partial vacuum to 225° C., and then for 2 hours at 225° C. The product was hard tan solid upon cooling. Analysis showed 87% conversion of total amino in the starting taurine to anionic surfactant.

EXAMPLE VIII

In a test tube were placed 1.57 parts (0.01 mole) of 95% 2-hydroxy-ethane sulfonate sodium salt, 4.26 parts (0.015 mole) of stearic acid and 0.117 part of boric acid. The test tube was then placed in an oil bath regulated at 240° C. The test tube was evacuated to 20 mm. mercury and the vacuum maintained while heating the tube in the bath for two hours. There was vigorous evolution of gas (H$_2$O vapor) during this period. The yield of tan solid obtained was 5.623 parts.

The tube contents were cooled and analyzed by the methylene blue method. There was found 1.650 millimoles of anionic surfactant per gram of sample. This corresponds to 92.8% conversion of the 2-hydroxy-ethane sulfonic acid salt.

A second experiment was carried out identical to that above except that no boric acid was added. Yield was 5.70 parts of product. There was found 0.3056 millimole of anionic per part of product (17.4% conversion of 2-hydroxy-ethane sulfonate, sodium salt to surfactant).

EXAMPLE IX

One equivalent of methyl taurine (powder) and 1½ equivalents of refined tall oil were heated at 250° C. in the presence of 12 parts of boric acid for 2 hours under 25 mm. mercury absolute pressure to give a crude anionic surfactant product.

EXAMPLE X

One equivalent of taurine, sodium salt and 1½ equivalents of commercially available naphthenic acids were heated at 250° C. for two hours under 25 mm. mercury absolute pressure in the presence of 10 parts of boric acid to give an anionic surfactant-naphthenic acids mixture.

EXAMPLE XI

One equivalent of aqueous butyl taurine, sodium salt, was concentrated to a slurry under vacuum and 2½ equivalents of lauric acid and 0.2 mole of boric acid added. The mixture was heated until liquid and the pressure gradually reduced to 35 mm. mercury while heating to 220° C. The mixture was stirred at 35 mm. mercury absolute pressure for 2 hours while keeping the temperature at 220° C. The final product in water yielded a foaming solution.

EXAMPLE XII

Into a 4-liter resin pot equipped with efficient stirrer, thermometer and short air condenser (attached to a trap and the vacuum line) were placed 1.365 parts (5.302 moles) of palmitic acid, 652 parts (3.537 moles total amino or 2.9 moles secondary amino) of spray-dried methyl taurine, sodium salt and 40 parts (.646 mole) of boric acid. The mixture was heated to 225° C. while gradually reducing the pressure to 15–25 mm. mercury. The mixture was then stirred at 225° C. for 2 hours. The final product, which weighed 1950.4 parts was poured onto flat pans to solidify. The very light tan product was then ground in a hammermill to a very light colored powder. Analysis for anionic surfactant by the methylene blue method showed 92.8% conversion based upon total amino in the methyl taurine. Analysis for fatty acid by caustic titration of petroleum ether extractables indicated that 60% of the theoretical excess fatty acid was recovered.

EXAMPLE XIII

Into a beaker were placed 36.8 parts (0.2 equivalent of amino) of methyl taurine, sodium salt, and 85.29 parts (0.3 mole) of stearic acid. The beaker contents were heated until melted and stirred well. 6 parts of the stirred mixture and 0.18 parts of boric acid were placed into an eight-inch test tube. The tube was immersed in an oil bath controlled at 280° C. for 10 minutes while under an absolute pressure of 25 mm. mercury. The product was analyzed by the methylene blue method for anionic surfactant and extracted with pertoleum ether to determine the amount of recovered fatty acid.

Percent conversion=90.3% based upon total amino in the crude taurine.
Percent recovery of fatty acids=98% based upon caustic titration of petroleum ether extractables.

A second experiment carried out as described above gave a conversion of 99% based on the methylene blue method. Other possible catalysts were utilized and compared with boron-containing compounds in the condensation reaction between stearic acid and methyl taurine. The results obtained are shown in the following table.

Table

| Catalyst | Amount of Catalyst,[1] Percent | Percent Conversion to Anionic Surfactant | |
|---|---|---|---|
| | | 2 Hr. at 225° C. | 10 Min. at 280° C. |
| none | none | 75 | 58 |
| boric acid | 2 | 91 | 99 |
| NaHSO₄ | 2 | 66 | 52 |
| CaSO₄ | 2 | 77 | 48.5 |
| Al₂O₃ | 2 | 74 | 57 |
| sodium tripolyphosphate | 2 | 80 | 61 |
| SnCl₂ | 2 | 67 | 47.5 |
| ZnCl₂ | 2 | 68 | 39 |
| SiO₂ (silica gel) | 2 | 72 | 57 |
| Borax | 2 | | 83 |
| B₂O₃ | 2 | | 69 |

[1] As weight percent of the weight of stearic acid plus the weight of crude methyl taurine powder.

From the foregoing table it is clearly manifest that the best results are obtained when employing a boron-containing compound as a catalyst, and that the percent conversion of the coreactants to anionic surface active agent (surfactant) is efficient at short periods of time and high temperatures and long periods of time at low temperatures.

EXAMPLE XIV

One-tenth of a gram-mole of N-ethyl taurine, Na salt powder was mixed with 0.2 gram-mole of capric acid and 1.5 grams of boric acid and heated while stirring at 225° C. The pressure was gradually reduced to 100 mm. mercury absolute pressure over a period of 1 hour and then heated for 1½ hours with stirring under 100 mm. mercury absolute pressure. The final product which contained some unreacted capric acid gave a very good foaming solution in water.

EXAMPLE XV

To 5.08 parts of an aqueous solution containing 0.01 mole of N-butyl taurine, sodium salt, was added 4.26 parts (0.015 mole) of stearic acid and 0.12 part (0.002 mole) of boric acid. The slurry was heated in a test tube at 100° C. under vacuum until nearly all of the water had been removed. The tube was then placed in an oil bath regulated at 280° C. The tube contents were placed under water aspirator vacuum (20–30 mm. mercury absolute pressure) and then heated in the bath for 10 minutes. The tube was removed from the bath and the weight of product obtained was 6.209 parts.

A second experiment was carried out identical with the above except that no boric acid catalyst was used. Analysis of the two products by the methylene blue method showed that the boric acid catalyzed reaction product contained almost twice as much anionic surface active agent as the product from the reaction carried out in the absence of boric acid.

EXAMPLE XVI

To 0.1 gram-equivalent of sodium 2-hydroxy-propane sulfonate was added 0.2 gram-equivalent of wood rosin. The mixture was stirred at 260° C. for 3 hours under 25 mm. mercury absolute pressure. The product gave low-foaming detersive solutions in water.

EXAMPLE XVII

To 1.697 grams of crude calcium salt of N-methyl taurine (containing 0.01 gram-mole of calcium salt of N-methyl taurine) in a test tube was added 4.26 grams (0.015 mole) of stearic acid and 0.12 gram (0.002 mole) of boric acid. The mixture was heated in an oil bath regulated at 280° C. for 10 minutes while keeping the tube contents under a vacuum of 20–30 mm. mercury absolute pressure. The reaction product weighed 5.498 grams.

A second experiment was carried out identical to that above except that no boric acid was used.

Analysis of both products by the methylene blue method showed the boric acid catalyzed product contained roughly twice as much anionic surface active agent as the uncatalyzed product.

EXAMPLE XVIII

To 0.01 mole of sodium 3-methylamino-2-butane sulfonate (N-methyl-1,2-dimethyl taurine, sodium salt) in a test tube was added 0.02 mole of x-dodecylbenzoic acid and .002 mole of boric acid. The mixture was heated in an oil bath at 250° C. for two hours, keeping the tube contents at 20-30 mm. mercury absolute pressure. The reaction product gave a foaming solution in water.

EXAMPLE XIX

To 0.01 mole of 3-hydroxy-2-butane sulfonate in a test tube was added 0.015 mole of myristic acid and 0.002 mole of boric acid. The tube was heated for 15 minutes in an oil bath kept at 280° C. while keeping the tube contents under vacuum of 20-50 mm. mercury absolute pressure to aid removal of water. The reaction product gave a detersive solution in water.

EXAMPLE XX

Into a test tube was placed 6.62 grams (0.01 mole) of 24.3% active aqueous 2-methyl taurine, 4.26 grams (0.015 mole) of stearic acid, and 0.12 gram (0.002 mole) of boric acid. Into a second tube was placed the same weights of reactants except that the boric acid was omitted. The two tubes were heated in an oil bath at 100° C. until distillation of water was slow. The tubes were then placed in a constant temperature oil bath controlled at 230° C. The tubes were heated in the oil bath for 2 hours at 30 mm. mercury absolute pressure. The second tube became black and had considerable weight loss. The product in the first tube was brown in color and contained 50% more anionic surfactant than the product in the second tube.

I claim:

1. The process of preparing anionic surface active agents which consists essentially of the steps of heating at a temperature of 200–320° C. and a pressure below atmospheric pressure, in the presence of a boron-containing compound as a catalyst, 1.2 to 10.0 moles of a carboxylic acid of 6 to 22 carbon atoms selected from the group consisting of aliphatic and alicyclic carboxylic acids with 1 mole of an alkane sulfonic acid salt selected from the class consisting of those of the following formulae:

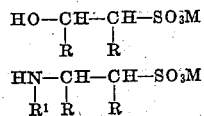

wherein R represents a member selected from the group consisting of hydrogen and lower alkyl groups, $R^1$ represents a member selected from the group consisting of hydrogen and a hydrocarbon radical of 1 to 20 carbon atoms, and M represents a salt forming group selected from the class consisting of alkali metals and alkaline earth metals.

2. The process according to claim 1 wherein the alkane sulfonic acid salt is the sodium salt of taurine.

3. The process according to claim 1 wherein the alkane sulfonic acid salt is the sodium salt of N-methyl taurine.

4. The process according to claim 1 wherein the alkane sulfonic acid salt is the sodium salt of N-ethyl taurine.

5. The process according to claim 1 wherein the alkane sulfonic acid salt is the sodium salt of isethionic acid.

6. The process according to claim 1 wherein the alkane sulfonic acid salt is the sodium salt of 2-hydroxy-propane sulfonic acid.

References Cited in the file of this patent

UNITED STATES PATENTS

| | | |
|---|---|---|
| 1,932,180 | Guenther et al. | Oct. 24, 1933 |
| 2,125,544 | Colbeth | Aug. 2, 1938 |
| 2,198,046 | Vierling | Apr. 23, 1940 |
| 2,209,634 | Muncie | July 30, 1940 |
| 2,216,618 | Katz | Oct. 1, 1940 |
| 2,234,581 | Rosen | Mar. 11, 1941 |
| 2,711,415 | Cottle et al. | June 21, 1955 |

OTHER REFERENCES

Ser. No. 249,340, Jablonski et al. (A. P. C.), published Apr. 20, 1943.